United States Patent Office 2,984,835
Patented May 16, 1961

2,984,835

BROADSIDE ANTENNA ARRAYS

Raymond H. Du Hamel and David G. Berry, Cedar Rapids, Iowa, assignors to Collins Radio Company, Cedar Rapids, Iowa, a corporation of Iowa Filed Sept. 21, 1959, Ser. No. 841,400

23 Claims. (Cl. 343—908)

This invention relates generally to broadside antenna arrays and more specifically to frequency independent broadside antenna arrays employing logarithmically periodic antenna elements which are the subject of U.S. application Serial Number 721,408, filed March 14, 1958, by Raymond H. Du Hamel and Fred R. Ore entitled "Logarithmically Periodic Antenna," U.S. application Serial Number 804,356, filed April 6, 1959, by Raymond H. Du Hamel and Fred R. Ore entitled "Frequency Independent Split-Beam Antenna," and U.S. application Serial Number 804,357, filed April 6, 1959, by Raymond H. Du Hamel and David G. Berry entitled "Unidirectional Frequency Coplanar Antenna." The three foregoing pending applications are incorporated as a part of this application by reference.

In the prior art there are known many forms of broadside antenna arrays. For example, a group of dipoles can be arranged end to end, i.e., lying in a straight line, to form an array. The radiation pattern for any given frequency is determined by the spacing between the individual antennas, such spacing being measured in wavelengths. It is a well-known fact that as the frequency varies, the wavelength spacing between the various antennas will also vary, thus resulting in a change in the radiation pattern and in antenna impedance. Such changes in pattern and impedance with frequency changes exist on all known broadside arrays and are ordinarily considered to be undesirable characteristics. Now, it would be possible by using a number of groups of antenna arrays to provide a fairly constant impedance and a fairly constant radiation pattern over a fairly large frequency bandwidth simply by changing from one group of elements to another as frequency move through predetermined ranges. Such an arrangement, however, would be very complex and quite expensive and would require a switching system which might prove to be a serious obstacle in the event large frequency changes occurred at a high repetition rate. It is evident that it would be quite desirable to have an antenna array capable of producing a highly directive beam pattern which would remain constant over large frequency changes and having an impedance which would also remain substantially constant over large frequency changes.

Recently a new type antenna element has been developed which makes such an array possible. A co-pending application Serial Number 841,391 entitled "Antenna Arrays" by Raymond H. Du Hamel and David G. Berry, and filed of even date discloses an end-fire antenna array using this new type antenna element which, as indicated above, is known as a logarithmically periodic antenna. Such antenna element is generally triangular in shape and has a vertex and side elements defined by an angle $\alpha$. A central conducting member extends from the vertex of the triangle and along the center line bisecting the angle $\alpha$. A plurality of teeth extend outwardly from said central conducting member and have their outer edges defined by the angle $\alpha$. The teeth on one side of the central conducting member are positioned opposite the gaps between the teeth on the other side of the central conducting member. Such teeth are all similar in shape and become progressively larger as the distance from the vertex increases. Also the gaps between the teeth become progressively larger as the distance from the vertex increases. The above relationship may be expressed by stating that the radial distance from the vertex to any point on any given tooth on one side of the central conducting member bears a constant ratio, designated as $\tau$, to the radial distance from the vertex to the corresponding point on the next adjacent tooth which is farther removed from the vertex than said given tooth (and on the same side of said central conducting member).

The end-fire array employing logarithmically periodic antenna elements mentioned briefly above has proven quite effective. However, it involves somewhat long antenna elements in order to produce a high gain characteristic. Further, a large $\tau$ value is required for a high gain characteristic. A large $\tau$ and a long antenna (that is a small $\alpha$) means that the antenna will occupy a large area and will require quite a bit of material. Further, such an array has obvious drawbacks if it were to be employed on an aircraft, for example, since it fires off the end. The antenna would have to be sunk into the aircraft. It would be more desirable to have an antenna array which could be mounted substantially flush with the surface of the aircraft. Such a result can be obtained by employing the logarithmically periodic antenna elements in a broadside antenna array which is the subject of this invention.

An object of this invention is to provide a broadside antenna array employing logarithmically periodic antenna elements.

Another object of this invention is to provide a broadside antenna array whose radiation pattern and impedance are independent of frequency.

A third object of the invention is to provide a broadside antenna array occupying a smaller space than an end-fire antenna array employing logarithmically periodic antenna elements and having a radiation pattern and impedance which are substantially independent of frequency.

The fourth object of the invention is the improvement of broadside antenna arrays generally.

In accordance with the invention there is provided a plurality of pairs of logarithmically periodic antenna elements, each element lying in a single plane and being generally triangular in shape, and further being defined at its outer edges by an angle $\alpha$. The vertices of all of the antenna elements are positioned close to each other but not touching, with the two elements of each pair of elements being positioned symmetrically about a given plane and being spaced apart by an angle greater than 90°. Each antenna element is constructed to have a substantial amount of radiation perpendicular to the plane of said antenna element.

In accordance with a particular form of the invention all of the plurality of pairs of antenna elements lie in the same plane. The elements of each pair of elements can be mirrored images of each other to produce a bidirectional split configuration radiation pattern broadside to the array. Conversely, one of the elements of each pair of mirrored elements can be rotated about its central conducting member 180° (thus producing a non-image pair of elements) to produce a bidirectional single-beam radiation pattern.

In accordance with the second embodiment of the invention constructed to produce a unidirectional radiation pattern, each of the plurality of pairs of antenna elements lies one behind the other with a common vertex (i.e. the vertices being close together but not actually touching). The elements of each pair of elements do not lie in the same plane necessarily but the two elements of each pair are positioned symmetrically about a common given plane. Further, the plane of each element intersects the plane of every other element along a common line which lies in said common given plane. The individual elements will then be arranged in a manner roughly comparable to the individual paddles of a paddle wheel with the vertex as the hub, except that the elements would not be symmetrically spaced around a complete 360°.

In accordance with a further modification of the invention the first two modifications of the invention are combined to form a three-dimensional array in which a first plurality of pairs of antenna elements are arranged so that one of the elements from each pair all lie in a first plane and the other element of each pair all lie in a second plane. The first and the second plane intersect at a center line which passes through the common vertex point. A second plurality of antenna elements are arranged so that one antenna element lies behind each of the antenna elements of said first group. More specifically, one of each pair of said second group of antenna elements lies in a third plane which lies behind said first plane a predetermined angular distance and passes through said center line. The other elements of said second group of antenna elements lie in a fourth plane which lies behind said second plane and also passes through said center line. The distance said second group of elements is positioned behind said first group of antenna elements is $\beta d$ wavelength. By a process known as "stretching" and described in detail later herein, the time phase of the signal radiated from said second group of elements is caused to lead the phase of the signal radiated by the said first elements. It is apparent that if the time phasing between the signals radiated by said first and second groups of antenna elements is $\pi - \beta d$ and if the wavelength spacing between the elements is $\beta d$ wavelength, the signals will add in one direction of radiation but tend to be out of phase in the opposite direction of radiation so that radiation will occur from only one side of the array, primarily.

These and other objects and features of the invention will be more fully understood from the following detailed description thereof when read in conjunction with the drawings, in which.

Figure 1:
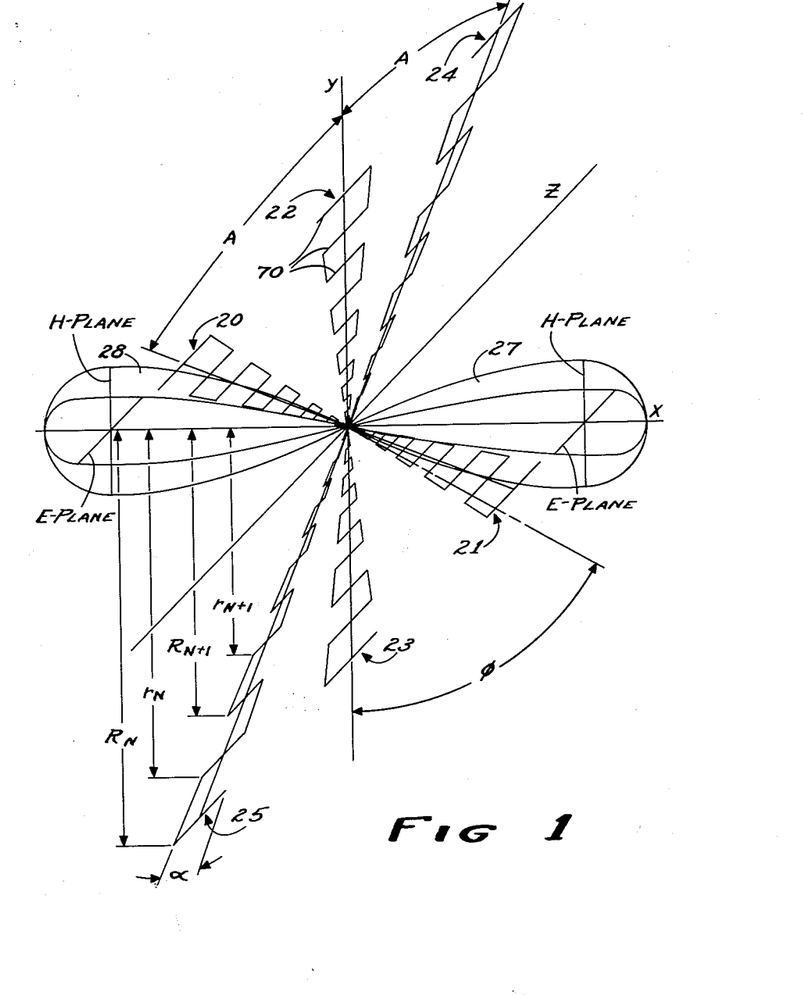
Fig. 1 shows one embodiment of a broadside array adapted to radiate a bidirectional radiation pattern.

Referring now to Fig. 1 the elements 20 and 21 form a pair of logarithmically periodic antenna elements, elements 22 and 23 form another pair of such elements, and elements 24 and 25 form a third pair of elements. All of the elements 20 through 25 lie in a common plane which is the YZ plane in Fig. 1. Each of the elements preferably is constructed to have the same values of $\tau$ and $\alpha$ so that the distance of the phase centers of elements will always bear the same relationship to each other in terms of wavelengths, thus insuring frequency independence of operation. Alternatively, however, $\alpha$ and $\tau$ can be made to be different for the different pairs of elements as long as the distance from the phase center to the common vertex maintains a constant relationship. It is to be noted, however, that for the two elements of any pair of antenna elements the values of $\tau$ and $\alpha$ should be the same. The selection of $\alpha$ and $\tau$ for different pairs of elements is a matter of design and is discussed in detail in the co-pending applications mentioned hereinbefore. Consequently, the specific selection of $\alpha$ and $\tau$ to produce certain results will not be discussed in detail in this specification.

It will be observed, from an examination of Fig. 1, that each pair of elements are non-image elements. By definition, image elements are those elements that would coincide if they were folded one upon the other about the vertex and without any rotation about their center elements. Non-image elements are a pair of image elements in which one of the elements has been rotated about its central conducting member 180°.

The parameters of logarithmically periodic antennas have been described in detail in the above-identified co-pending applications. However, to capitulate briefly, the following relationships are given:

$$\frac{R_N}{r_n} = \tau = \frac{R_N+1}{r_n+1} \qquad (1)$$

for each of the antenna elements shown in Figs. 1 through 8. The angle $\alpha$ defines the outer boundaries of the antenna element. The angle A (see Fig. 1) defines the spacing between the central conducting members of elements aligned in the same plane. It has been found that this spacing should not be less than about ¾ wavelength for good results.

It is to be understood that Equation 1 is true for all adjacent teeth of any given tooth, that is to say, the ratio of the radial distance from the vertex to the outer edge of any given tooth to the radial distance from the vertex to the outer edge of the next adjacent tooth farther removed from said vertex is a constant $\tau$. The same constant relationship exists between the inner sides of adjacent teeth.

The array shown in Fig. 1 will produce a bidirectional beam represented generally by the lobes 27 and 28 which are shown to have an E plane and an H plane. The E plane of radiation is defined as the plane parallel to the individual transverse elements such as elements 70 of each of the individual antenna elements. In some of the structures such as the structure of Fig. 2 this is not altogether true. For example, in Fig. 2 the transverse elements of antenna elements 35, 36, 39, and 40 are not parallel to the E plane. However, they are sufficiently parallel thereto to contribute a substantial portion of radiation in the E plane. Obviously, the definition of the E plane must be somewhat loose in the case of the structure of Fig. 2.

Referring again to Fig. 1 the H plane as defined as the plane lying perpendicular to the individual transverse elements such as elements 70 of the antenna elements 20 through 25.

It has been found that individual antenna elements having relatively large $\alpha$'s say of the order of 20° to 30° and having small $\tau$'s produce radiation fields in the E plane having rather large angles of half-power beam width. Thus, in Fig. 1 elements 22 and 23 function to produce a bidirectional beam substantially along the X axis; the radiation pattern from each of the elements 22 and 23 combining to produce the resultant radiation pattern. It is to be noted that the fields in the YZ plane produced by the individual elements 22 and 23 tend to cancel each other. Worded in another way, each antenna element tends to fire off its vertex, thus elements 22 and 23 would tend to fire into each other. Thus, along the Y axis cancellation occurs. However, along the X axis the components of the radiation will add to produce a bidirectional beam. In accordance with well-known antenna theory, by adding other pairs of elements such as the pairs including elements 21 and 20 and the pair including elements 24 and 25 will result in a more highly directional beam, although still bidirectional.

Figure 2:
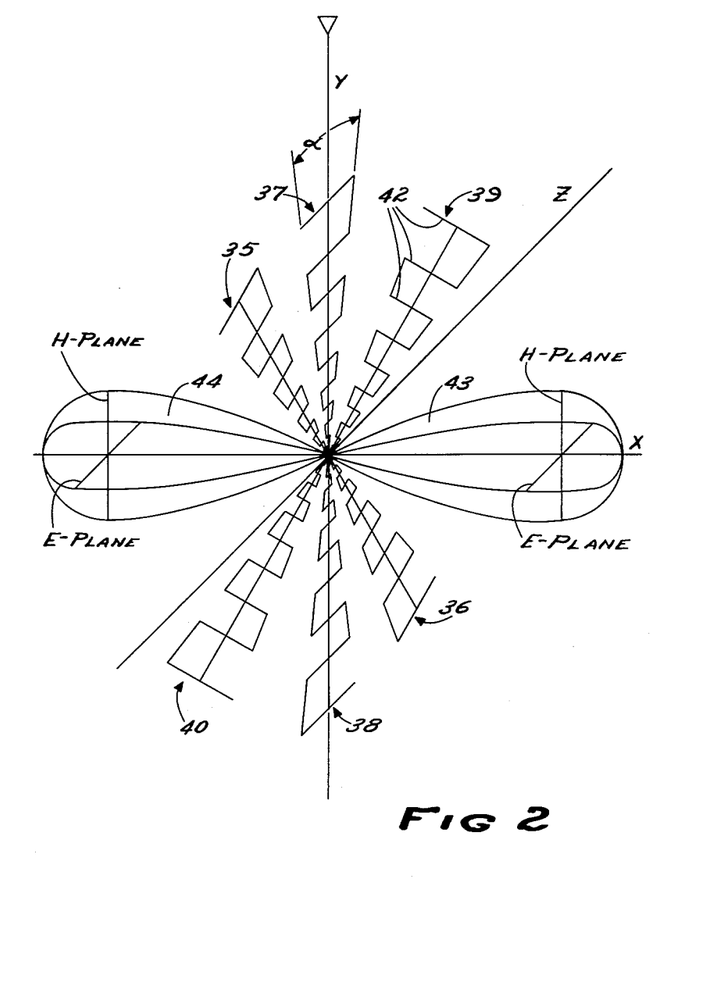
Fig. 2 shows another form of the embodiment of the invention also constructed to radiate a bidirectional radiation pattern.

Referring now to Fig. 2 there is shown an alternative form of the invention in which the transverse elements (such as transverse elements 42) of any pair of antenna elements are not parallel with the transverse elements of any other pair of antenna elements. This fact was also briefly discussed hereinbefore in connection with the structure of Fig. 1. The structure of Fig. 2 will produce a bidirectional beam indicated generally by the lobes 43 and 44.

Figure 3:
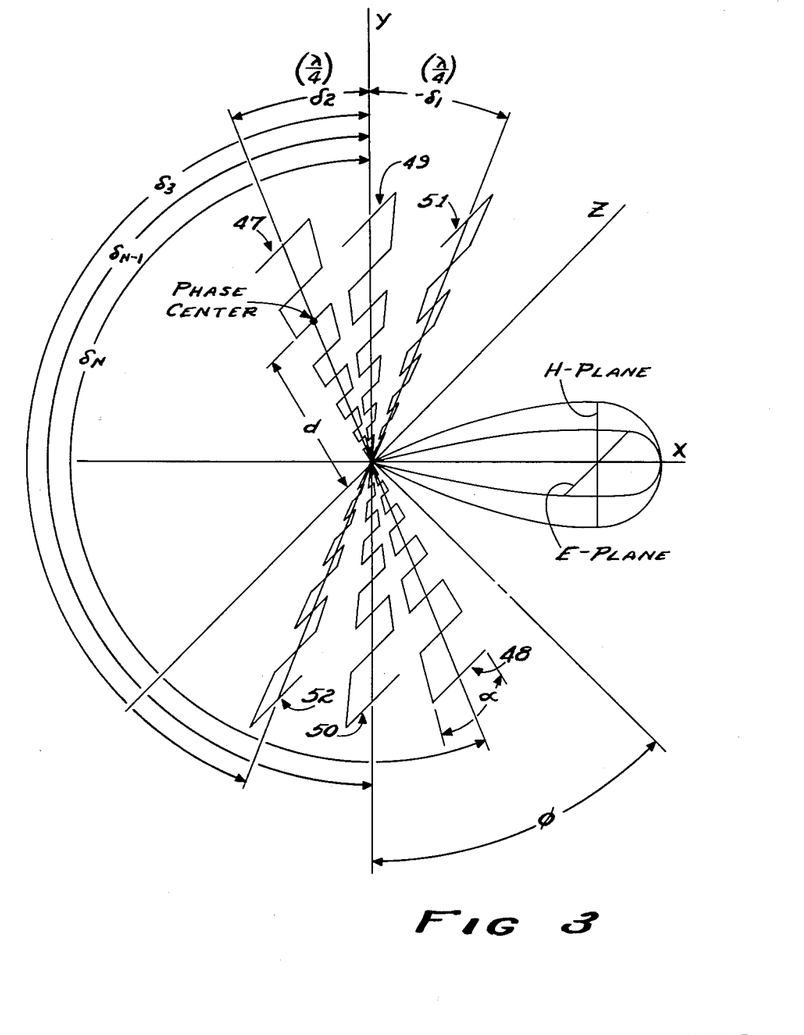
Fig. 3 shows a third form of a broadside array constructed to radiate a unidirectional beam.
Figure 4:
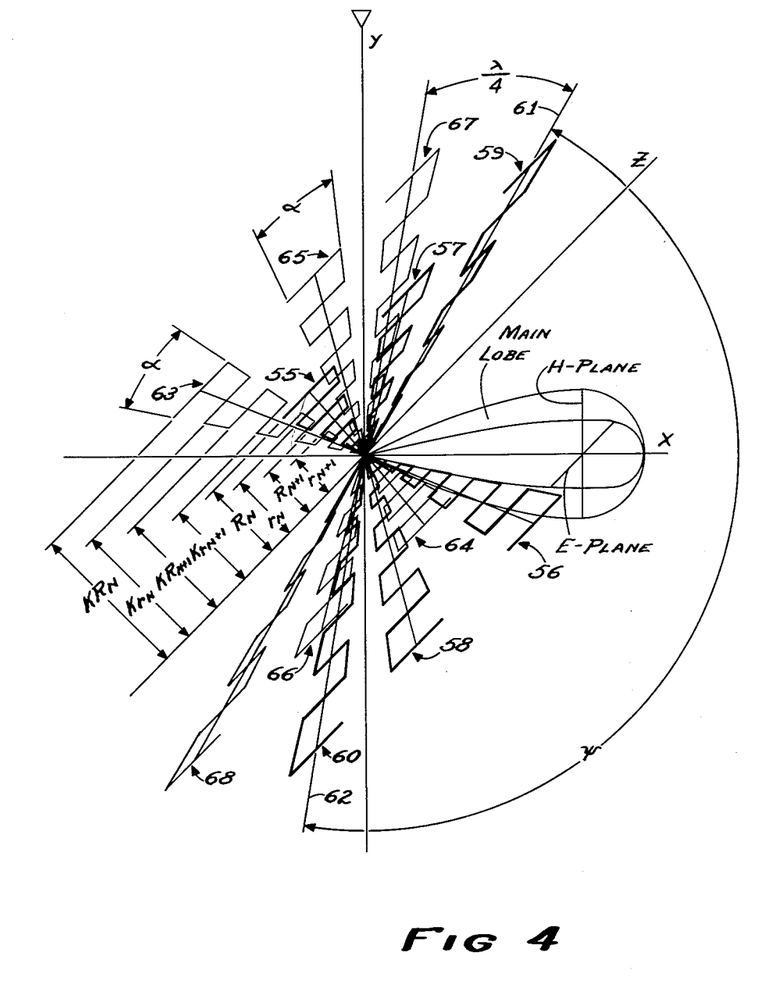
Fig. 4 illustrates another form of the invention also constructed to radiate a substantially unidirectional beam.

For many applications the bidirectional beams produced by the structures of Figs. 1 and 2 is an undesirable situation. A unidirectional beam is frequently more advantageous. The structures of Figs. 3 and 4 show broadside arrays which are capable of producing highly directive unidirectional beams. The structure of Fig. 3 is the simpler of the two structures and is, in essence, a two-dimensional array, whereas the structure of Fig. 4 is a three-dimensional array. Referring now specifically to Fig. 3 there are shown three pairs of elements, the first pair being comprised of antenna elements 47 and 52, the second pair being comprised of elements 49 and 50, and the third pair being comprised of elements 51 and 48. In order to better understand the operation of the structures of Figs. 3 and 4 it is believed desirable to discuss the concept of stretching and shrinking of logarithmically periodic antenna elements. Such stretching or shrinking will function to change the phase of the radiated signal with respect to the phase of the supplied (or feed) signal.

To clarify the concept of shrinking and stretching the following analogy might be useful. Assume the antenna element is composed of a spring wire formed in the shape of an individual element shown in Fig. 1 and fastened securely to some fixed point at the vertex. Now if the end of the antenna opposite the vertex is moved away from the fixed vertex, the antenna will be stretched, i.e., every point in the antenna will move out from the vertex radially by a constant factor K. Conversely, if the antenna is compressed back towards the vertex, it is said to be shrunk and every point in the antenna is moved back toward the vertex by a constant factor K. In order for the foregoing analogy to be valid, two assumptions must be made. The first assumption is that the bending point of the spring must not be exceeded. The second assumption is that if a spring were, in fact, stretched as described above, the angle determined by the outer edges of the spring would vary, decreasing with stretching and increasing with compression. In the case of stretching or compressing an antenna this angle $\alpha$ must remain the same. Consequently, it can be seen that the analogy of the spring is not a completely accurate analogy. An additional point to be noted is that a stretched or shrunk antenna should have the same over-all length as another antenna which is stretched or shrunk in a different degree. Further, it has been found that the phase center of an element does not vary when the element is stretched or shrunk. But even though the phase center does not vary it has been found that the phase of the radiated signal at the phase center will vary with respect to the phase of the input signal fed to the antenna element at the vertex. This characteristic of logarithmically periodic antennas is defined as the phase rotation phenomena. It has been verified experimentally that when an element is shrunk or stretched through one complete period the phase of the signal is advanced or delayed 360°. A period is defined as the stretching or shrinking of an element such that any given tooth will move away from or toward the vertex to occupy the position of the next adjacent tooth before stretching or shrinking was initiated. Somewhat different expressions are employed to define shrinking or stretching. For shrinking the expression for K in terms of $\lambda$ is $$K = \tau^{\frac{-\gamma_n}{2\pi}}$$

where $\gamma$ equals the amount of phase delay in radians.

For stretching the element the relationship between K and $\gamma$ is as follows:

$$K = \tau^{\frac{\gamma_n}{2\pi}}$$

where $\gamma$ equals the phase advance in radians. It is to be noted that the phase center and radiation pattern are substantially independent of the expression or contraction of a logarithmically periodic element provided that $\alpha$ and $\tau$ remain unchanged.

Returning now to a discussion of the structure of Fig. 3 the general expression for the radiation pattern of the array shown therein is given by $$E(\phi) = \sum_{n=1}^{N} A_n f(\phi - \delta_n) e^{-j[\beta d \cos(\phi - \delta_n) - \gamma_n]} \quad (2)$$

where, $f(\phi - \delta_n)$ of the exponent represents the phase advance of the phase center relative to the vertex, and the values $d$, $\phi$, and $\delta$ being indicated in Fig. 3. The value of the feed-point voltage for the $n^{th}$ element is given by $A_n$. The parameter $\gamma_n$ is the relative phase of the field radiated from the $n^{th}$ element. More specifically, $\gamma_n$ is the change in phase introduced into any given element by stretching or shrinking that element so as to produce a desired phase relationship between the fields radiated by the various elements. As indicated hereinbefore, shrinking or stretching an element will result in a phase shift of the radiated signal with respect to the phase of the input (or feed) signal.

The assumptions made in Equation 2 are that the element patterns and input impedances are identical. Although mutual effects can introduce some error into these assumptions, good correlation between theory and experiment has been obtained. It is necessary, in the construction of an array, to determine the radiation pattern of each individual element used therein. The radiation pattern of a single element will depend primarily upon the design parameters $\alpha$ and $\tau$.

The phase centers of the individual antenna elements can be determined by mounting the elements on a vertical rotating mast and measuring the phase of the received signal at a distant antenna. It has been found that the distance $d$, i.e., the distance in wavelengths to the vertex from the phase center is essentially independent of $\tau$ but quite dependent upon $\alpha$.

The information that has been supplied above is sufficient for predicting the pattern of an array of similar end-fire elements with the only difference between individual elements being the scale factor K (stretching or shrinking factor). The method for predicting a pattern of an array could be generalized to include arrays of elements with different $\alpha$'s and possibly different $\tau$'s. However, if different $\tau$'s are used, it would be necessary that the logarithm of any $\tau$ to the base of any other $\tau$ be a ± integer, i.e., $\tau' = \tau^{\pm n}$. Also if different $\alpha$'s are used, it is necessary to take into account the relative phase of the radiated field compared to the phase of the feed point current of the various logarithmically periodic elements.

In the specific structure shown in Fig. 3 it has been found that if the angles $\delta_1$ and $\delta_2$ are equal to one-fourth wavelength and further if the elements 51 and 52 are stretched through one-quarter wavelength, i.e., $K = \tau^{1/4}$ and if the elements 47 and 48 are stretched through 270°, that is $K = \tau^{3/4}$, the structure will produce a unidirectional beam along the positive X axis and no beam along the negative X axis. This can be understood more clearly with closer examination. Assume a common signal is fed to the vertices of all of the elements. The signal radiated from element 51 (and element 48) will lag the signal radiated from element 49 by 90° but will lead the signal radiated from element 47 by 180°. The aforementioned relationships are time relationships. By the time the signal radiated from element 51 reaches the plane of element 49 it will lag the signal being generated by element 47 by 180° and will thus cancel in the minus X direction. By the time the signal radiated from element 49 reaches the plane element 47 it will lead the signal generated by element 47 by 180° and consequently will cancel out the signal radiated (in the minus X direction). Thus, it can be seen that no signal will be radiated in the minus X direction.

The situation is different in the positive X direction however. Consider first the signal radiated by the element 47. By the time such signal reaches the plane of the element 49 said signal will lag the signal generated by element 49 by 360° and consequently will be in phase therewith to produce a beam along the positive X axis. Consider now the signal generated at the plane of the element 49. By the time such signal reaches the plane of the element 51 it will be in phase with the signal 51, thus producing a beam in the positive X direction.

It is to be noted that the structure of Fig. 3 can be employed to produce a steerable radiation pattern above and below the XZ plane. Such steering is accomplished generally by disconnecting certain of the antenna elements from the supply signal and terminating said disconnected antenna elements in their characteristic impedances. More specifically, assume that elements 51 and 52 are disconnected from the supply signal and are terminated in their characteristic impedances. The beam then radiated from elements 47, 48, 49, and 50 will be elevated to an attitude above the XZ plane. Similarly, if elements 48 and 47 are disconnected from the supply source and terminated in their characteristic impedance, the remaining elements 49, 50, 51 and 52 will radiate in a plane below the XZ plane.

Referring now to Fig. 4 there is shown a three-dimensional array which is a composite of the structures shown in Figs. 1 and 3. More specifically, a first plurality of pairs of antenna elements comprise the pair consisting of elements 55 and 56, the pair consisting of elements 57 and 58, and the pair consisting of elements 59 and 60. It will be observed that these three pairs of elements are similar to the arrangement shown in Fig. 1 with the exception that they do not all lie in the same plane. More specifically, the elements 55, 57, and 59 lie in a first plane and the elements 56, 58, and 60 lie in a second plane. The first and second planes being symmetrical about the XZ plane of the drawing. The angles between the central members of each pair of elements is less than 180°. For example, the angle $\psi$ between the central conducting members 61 and 62 of antenna elements 59 and 60 is less than 180°. It will be observed that the angle between the central conducting members of elements 57 and 58 will be less than the angle $\psi$ between elements 59 and 60 due to the fact that the central conducting members 57 and 58 form right angles with the line of intersection of the two planes in which the elements 57 and 58 lie.

The specific value for the angle between the central conducting members of each pair of elements, such angle hereinafter being generally referred to as $\psi$ except when otherwise indicated, will be determined by the values of $\alpha$ and $\tau$ of the individual antenna elements. The wavelength distance between any of the elements 55 through 60 and the antenna element directly behind it should be one-quarter wavelength in order to produce a unidirectional beam.

As can be seen from Fig. 4 the elements lying behind the antenna elements 55 through 60 are designated by the reference characters 63, 64, 65, 66, 67, and 68. Such last-mentioned elements are grouped in pairs with elements 63 and 64 forming one pair, elements 65 and 66 forming a second pair, and elements 67 and 68 forming the third pair. The elements 63, 65, and 67 all lie in the same plane and the elements 64, 66, and 68 also all lie in the same plane, but which is not necessarily the same plane in which the elements 63, 65, and 67 lie.

As indicated hereinbefore the elements 63 through 68 are positioned an angular distance of one-quarter wavelength behind elements 55 through 60 respectively.

It will be apparent, however, that with no other differences except a quarter wavelength spacing between elements, a signal radiated from element 59, for example, will reach the antenna 67 only 90° out of phase with the signal being radiated at the plane of the antenna 67. Thus there would be a beam radiated along the minus X axis, which is an undesirable characteristic if a unidirectional beam along the positive X axis is desired. Further, the signal radiated from the antenna element 67 will reach the plane of the element 59 lagging 90° behind the signal radiated from the element 59. Thus the addition of the two radiated signals is not equal to the greatest possible value which would be achieved only if the two signals were in phase. From the above statements it can be seen that the mere act of spacing the elements 67 and 59 a quarter wavelength apart will not eliminate the bidirectional radiation characteristics of the elements, but will only change the radiation pattern on either side of the YZ plane.

In prior art arrays the formation difficulty has been overcome by time phasing the signal radiated from the antenna element 67 90° ahead of the signal radiated by the element 59 in addition to spacing the two elements a quarter wavelength apart. Under these circumstances the signal radiated from the element 59 would reach the element 67 180° behind the signal radiated by element 67, thus producing cancellation along the minus X axis. On the other hand, the signal radiated by the element 67 would be in phase with the signal radiated by the element 59 in the plane of the element 59, thus producing a beam along the positive X axis.

In the immediately foregoing discussion only the elements 59 and 67 have been considered. It is to be understood that the element 59 does not function alone. It functions in cooperation with element 60 to form a pair of elements. Similarly the element 67 functions in cooperation with the element 68 to form a pair of elements. The other eight elements in the figure also function in pairs as discussed hereinbefore.

In the structure of Fig. 4, however, as in the structure of Fig. 3, it is not necessary to phase the supply signal before feeding said supply signal to the antenna elements as would be necessary in some prior art antenna arrays. As indicated supra, the logarithmically periodic antenna element itself can produce a change of phase of the radiated signal with respect to the signal supplied to the antenna element by stretching or shrinking the antenna element. In the case of the structure of Fig. 4, each of the elements 63 to 68 is shrunk 90° which means that all of the radial dimensions are reduced by a factor K which is equal to $\tau^{-1/4}$. Such shrinkage, of course, is done with respect to the elements 55—60 as a standard.

The use of the three-dimensional array shown in Fig. 4 results in a more highly directional beam in accordance with well-known antenna theory.

In designing a particular broadside antenna array, the following expression may be employed:

$$\frac{D}{\lambda} = \frac{40}{BW} \qquad (3)$$

where BW is the half-power beam width in degrees, and the distance between the phase centers of the two outer elements (such as elements 55 and 59 of Fig. 4) must be approximately D in wavelengths. Results indicate that a reasonable maximum spacing between the phase centers of adjacent elements is 0.7 wavelength. Thus the number of elements may be determined approximately from the expression:

$$N - 1 \approx \frac{D}{0.7\lambda} = \frac{57.1}{BW}$$

where N equals the number of pairs of elements lying side by side such as the three parts including elements 55 through 60. Knowing the number of elements necessary to produce a radiation pattern having a beam width BW, the Expression 2 can be employed to compute the radiation field at any given point in space.

It is to be noted that the Expression 3 is also applicable when designing arrays of the type shown in Figs. 1, 2, and 3. For a more detailed analysis of the procedure for designing a broadside array having specific characteristics, reference is made to the aforementioned co-pending application entitled "Antenna Arrays," filed September 21, 1959, by Raymond H. DuHamel and David G. Berry, and having the Serial Number 841,391.

Figure 5:
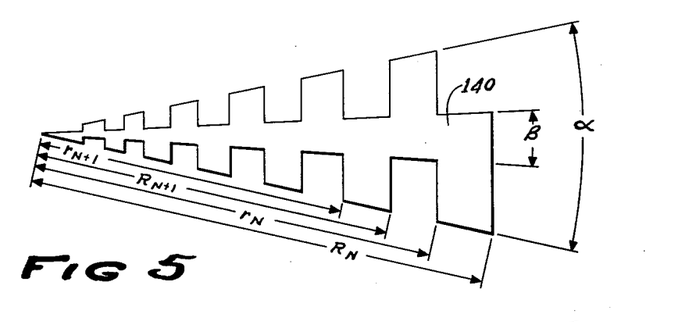
Figs. 5, 6, 7, and 8 show various types of antenna elements that may be employed in the arrays of Figs. 1 through 4.
Figure 6:
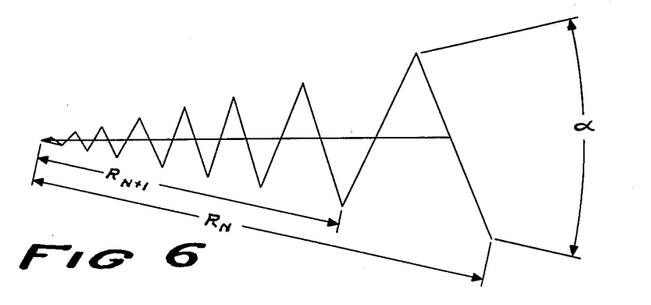
Figure 7:
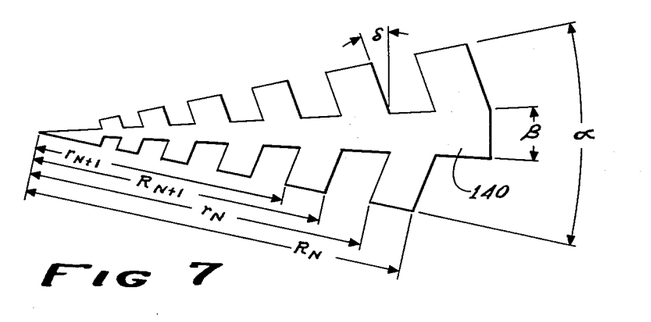
Figure 8:
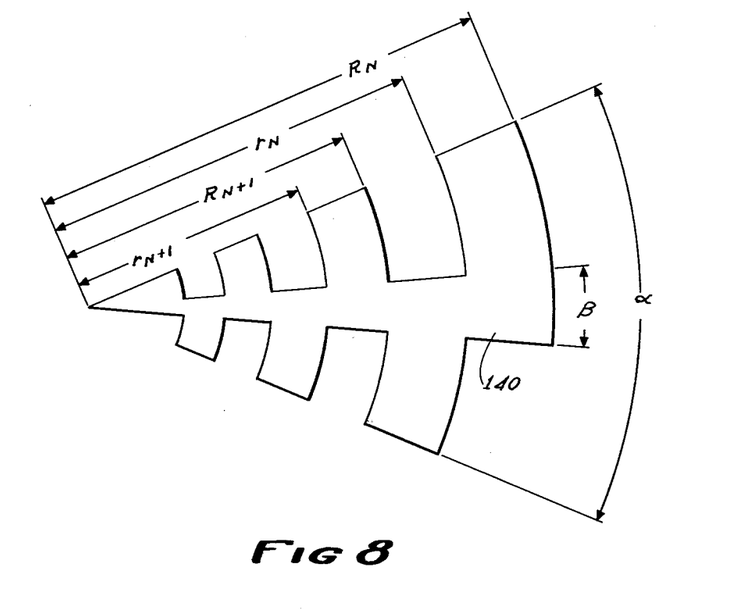
Figure 9A:
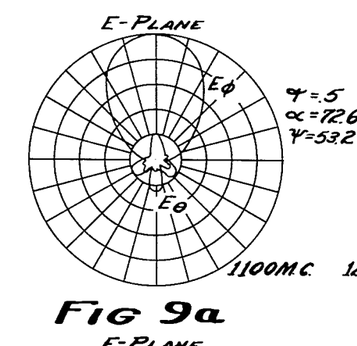
Figs. 9a through 9f show patterns of a unidirectional broadside array of the type shown generally in Fig. 3.
Figure 9B:
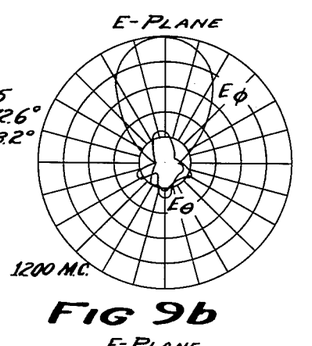
Figure 9C:
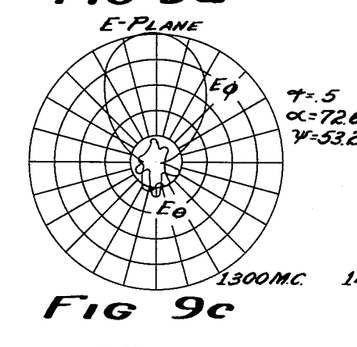
Figure 9D:
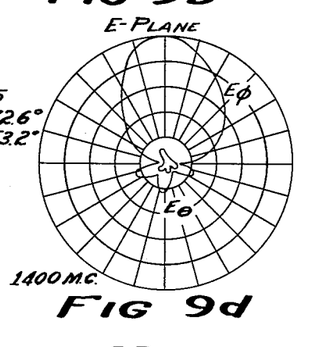
Figure 9E:
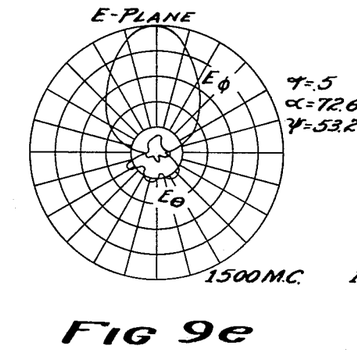
Figure 9F:
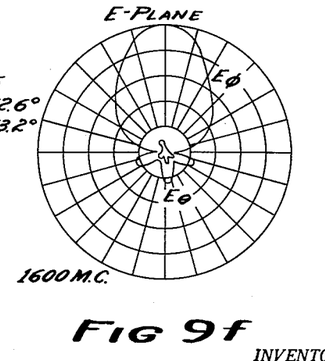

Referring now to Figs. 5, 6, 7, and 8 there are shown various types of logarithmically periodic antenna elements which may be employed in lieu of the specific elements shown in Figs. 1–4. Each of the elements shown in Figs. 5–8 lies in a single plane. The radial dimensions are designated by the reference characters $R_N$, $r_N$, $R_N+1$, and $r_N+1$, which have the same meanings as do the corresponding reference characters used in Figs. 1 and 4. That is to say, in each of the antenna elements in Figs. 5–8, the ratio of the radial distance from the vertex to any point on a given tooth to the radial distance from the vertex to the corresponding point on the next adjacent tooth farther removed from the vertex is a constant $\tau$. It is to be noted that for different antenna elements the value may have a different value but for any given antenna element $\tau$ is a constant for the teeth on both sides of the central conducting element. The angle $\alpha$ for each of the elements of Figs. 5–8 has the same definition as the angle $\alpha$ used in Figs. 1–4. The angle $\beta$ appearing in Figs. 5, 7, and 8 defines the angular boundaries of the central conducting member. It has been found that in logarithmically periodic antenna elements employing solid teeth, better results are obtained with a center conducting member which increases in width as the distance from the vertex increases. As can be seen from the Figs. 5, 7, and 8, this increase in width is defined by the angle $\beta$. It is to be understood that the angle $\beta$ as used in Figs. 5, 7, and 8 is not the same $\beta$ that is employed in Equation 2. In Equation 2 $\beta$ represents the number of radians per unit distance, i.e. in Equation 2

$$\beta = \frac{2\pi}{\lambda}$$

It is to be noted that one of the more important features of the broadside antenna arrays employing logarithmically periodic antenna elements lies in the fact that a logarithmically periodic antenna element can be stretched or shrunk to change the phase of the radiated signal with respect to the supplied signal without changing the position of the phase center with respect to the vertex. This enables the production of a uni-directional beam without having to provide external circuit means for shifting the phase of the signal supplied to certain of the antenna elements in the array.

In the structure shown in Figs. 1–4 the pairs of antenna elements are shown as non-image elements which function to produce a single beam in the E plane. If it is desired to produce a split beam in the E plane, such result can be accomplished by employing image elements in each pair of antenna elements.

Additionally, if lobes in both directions are desired, but having different magnitudes, such a result can be obtained by altering the wavelength spacing between front and back antenna elements of the structures of Figs. 3 and 4, or changing the degree of shrinking the back elements of Fig. 3 or 4.

Referring now to Figs. 9a–9f there are shown the radiation patterns in the E plane of two element arrays of the type shown in Fig. 3 for six different frequencies. The values of $\tau$, $\alpha$, and $\psi$ are indicated on the drawing.

It is to be understood that the forms of the invention herein shown and described are but preferred embodiments thereof and that various changes may be made in characteristics of antenna elements and in arrangement of antenna elements without departing from the spirit or the scope of the invention.

We claim:

1. A broadside antenna array comprising a first plurality of pairs of logarithmically periodic antenna elements, each antenna element lying in a single plane, being generally triangular in shape, and defined at its outer edges by an angle $\alpha$, each antenna element further comprising a central conducting member and a plurality of teeth extending outwardly from either side of said central conducting member, the outer edges of said teeth being defined by the angle $\alpha$, said teeth on one side of said central conducting member being positioned substantially opposite the gaps between the teeth on the other side of said central conducting member, the ratio of the radial distance from the vertex of the angle $\alpha$ to any point on a given tooth to the radial distance from the vertex to the corresponding point on the next adjacent tooth farther removed from said vertex being a constant, the vertices of all of said antenna elements being positioned near a common point but not making electrical contact with each other, the two elements of each pair of elements being positioned symmetrically about a first plane and being spaced apart by an angle greater than 90°, each antenna element constructed to have a substantial amount of radiation perpendicular to the plane of said antenna element, and the plane of each of said antenna elements being parallel with and containing a straight line which passes through said common point.

2. A broadside antenna array in accordance with claim 1 in which all of said antenna elements on one side of said first plane lie in a second plane and having the phase centers of adjacent antenna elements spaced apart an angular distance equal to not less than one-quarter wavelength, and in which all of the antenna elements on the other side of said first plane lie in a third plane and having the phase centers of adjacent antenna elements spaced apart an angular distance equal to not less than one-quarter wavelength.

3. A broadside antenna array in accordance with claim 2 in which said teeth are solid and have straight inner and outer sides, said teeth being on opposite sides of said central conducting member, the ratio of the radial distance from the vertex to the inner side of any tooth and the radial distance from the vertex to the outer side to the next adjacent tooth farther out from the vertex and on the same side of the central conducting member being equal to a constant $\tau$, the ratio of the radial distance from the vertex to the inner side of a given tooth and the radial distance from the vertex to the outer side of said given tooth being equal to a constant $\rho$ except near the vertex ends of said antenna elements, the teeth on opposite sides of each antenna element being arranged in a spiral staircase manner.

4. A broadside antenna array in accordance with claim 3 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

5. A broadside antenna array in accordance with claim 2 in which said teeth are formed of rods defining the periphery of said teeth, and in which said central conducting member is a center rod positioned along the center line of each of said antenna elements and connected to each of transverse portions of the rods forming said teeth.

6. A broadside antenna array in accordance with claim 5 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

7. A broadside antenna array in accordance with claim 2 in which each antenna element comprises triangularly shaped teeth formed on either side of said central conductive member, said triangularly shaped teeth being formed by a plurality of straight rods connected across said central conductive member and having their ends connected to adjacent rods along the boundaries defined by the angle α, alternate rods being parallel, and the distance from the vertex of any given antenna element to the opposite ends of each rod thereon having a constant ratio.

8. A broadside antenna array in accordance with claim 7 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

9. A broadside antenna array in accordance with claim 2 comprising a second plurality of antenna elements individually arranged one each behind each of the antenna elements of said first plurality of antenna elements an angular distance equal to one-quarter wavelength, each of said antenna elements of said second plurality of antenna elements being stretched by π/2 radians, and the vertices of each of said antenna elements being in close proximity to, but not quite touching, the vertices of the antenna elements of the first plurality of antenna elements.

10. A broadside antenna array in accordance with claim 9 in which said teeth are solid and have straight inner and outer sides, said teeth being on opposite sides of said central conducting member, the ratio of the radial distance from the vertex to the inner side of any tooth and the radial distance from the vertex to the outer side to the next adjacent tooth farther out from the vertex and on the same side of the central conducting member being equal to a constant τ, the ratio of the radial distance from the vertex to the inner side of a given tooth and the radial distance from the vertex to the outer side of said given tooth being equal to a constant ρ except near the vertex ends of said antenna elements, the teeth on opposite sides of each antenna element being arranged in a spiral staircase manner.

11. A broadside antenna array in accordance with claim 10 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

12. A broadside antenna array in accordance with claim 9 in which said teeth are formed of rods defining the periphery of said teeth, and in which said central conducting member is a center rod positioned along the center line of each of said antenna elements and connected to each of transverse portions of the rods forming said teeth.

13. A broadside antenna array in accordance with claim 12 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

14. A broadside antenna array in accordance with claim 9 in which each antenna element comprises triangularly shaped teeth formed on either side of said central conductive member, said triangularly shaped teeth being formed by a plurality of straight rods connected across said central conductive member and having their ends connected to adjacent rods along the boundaries defined by the angle α, alternate rods being parallel, and the distance from the vertex of any given antenna element to the opposite ends of each rod thereon having a constant ratio.

15. A broadside antenna array in accordance with claim 14 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

16. A broadside antenna array in accordance with claim 1 in which the antenna elements on one side of said first plane are positioned one behind the other an angular distance equal to one-quarter wavelength apart such that a plane passing through the central conducting members of said antenna elements is perpendicular to each of the planes of the antenna elements, and in which the antenna elements on the other side of said first plane are located, with respect to their general triangular configuration in mirrored positions of said elements on said one side of said first plane with respect to said first plane, any given antenna element being stretched through π/2 radians with respect to the antenna element immediately in front of said given element.

17. A broadside antenna array in accordance with claim 16 in which said teeth are solid and have straight inner and outer sides, said teeth being on opposite sides of said central conducting member, the ratio of the radial distance from the vertex to the inner side of any tooth and the radial distance from the vertex to the outer side to the next adjacent tooth farther out from the vertex and on the same side of the central conducting member being equal to a constant τ, the ratio of the radial distance from the vertex to the inner side of a given tooth and the radial distance from the vertex to the outer side of said given tooth being equal to a constant ρ except near the vertex ends of said antenna elements, the teeth on opposite sides of each antenna element being arranged in a spiral staircase manner.

18. A broadside antenna array in accordance with claim 17 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

19. A broadside antenna array in accordance with claim 16 in which said teeth are formed of rods defining the periphery of said teeth, and in which said central conducting member is a center rod positioned along the center line of each of said antenna elements and connected to each of transverse portions of the rods forming said teeth.

20. A broadside antenna array in accordance with claim 19 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

21. A broadside antenna array in accordance with claim 16 in which each antenna element comprises triangularly shaped teeth formed on either side of said central conductive member, said triangularly shaped teeth being formed by a plurality of straight rods connected across said central conductive member and having their ends connected to adjacent rods along the boundaries defined by the angle α, alternate rods being parallel, and the distance from the vertex of any given antenna element to the opposite ends of each rod thereon having a constant ratio.

22. A broadside antenna array in accordance with claim 21 in which all of the radial dimensions of selected ones of said antenna elements are altered by a factor which is constant for any given antenna element but which can be different for different elements to produce desired phase shifts in the signal radiated from each of said selected antenna elements to produce a desired resultant radiation pattern.

23. A broadside antenna array comprising a first plurality of pairs of logarithmically periodic antenna elements, each antenna element lying in a single plane, being generally triangular in shape, and defined at its outer edges by an angle $\alpha$, each antenna element further comprising a central conducting member and a plurality of teeth extending outwardly from either side of said central conducting member, the outer edges of said teeth being defined by the angle $\alpha$, said teeth on one side of said central conducting member being positioned substantially opposite the gaps between the teeth on the other side of said central conducting member, the ratio of the radial distance from the vertex of the angle $\alpha$ to any point on a given tooth to the radial distance from the vertex to the corresponding point on the next adjacent tooth farther removed from said vertex being a constant, the vertices of all of said antenna elements being positioned near a common point but not making electrical contract with each other, the two elements of each pair of elements being positioned symmetrically about a first plane and being spaced apart by an angle greater than 90°, each antenna element constructed to have a substantial amount of radiation perpendicular to the plane of said antenna element, and the plane of each of said antenna elements being parallel with and containing a straight line which passes through said common point, and lies in said first plane, each antenna element being perpendicular to the plane passing through the central conducting members of the pair of elements containing said each antenna element, all antenna elements lying in the same common plane being constructed to respond to a common input signal to produce radiated fields therefrom which will be in phase with each other in a plane perpendicular to the common plane of the antenna elements and to said first plane and passing through said common point.

References Cited in the file of this patent

Pub. 1: Du Hamel and Berry, "Logarithmically Periodic Antenna Arrays," August 19–22, 1958, IRE Wescon Convention Record, pp. 161–174.

Pub. 2: Du Hamel and Ore, "Logarithmically Periodic Antenna Designs," March 24–27, 1958, IRE National Convention Record, Part I, pp. 139–151.